United States Patent [19]

Spitzer et al.

[11] Patent Number: 4,717,550

[45] Date of Patent: Jan. 5, 1988

[54] PROCESS FOR PURIFYING ALUMINA

[75] Inventors: Donald P. Spitzer, Riverside; David W. Lipp, Stamford; Alan S. Rothenberg, Norwalk; Hans P. Panzer, Stamford, all of Conn.

[73] Assignee: American Cyanamid Company, Stamford, Conn.

[21] Appl. No.: 916,981

[22] Filed: Oct. 9, 1986

[51] Int. Cl.$^4$ .............................................. C01F 7/06
[52] U.S. Cl. .................................... 423/121; 423/122; 423/131; 423/139; 423/140; 423/600; 423/625; 210/705; 210/710; 210/736
[58] Field of Search ............... 423/139, 140, 122, 131, 423/112, 121, DIG. 14, 600, 625; 75/101 BE, 2, 108; 210/688, 702, 705, 710, 736

[56] References Cited

U.S. PATENT DOCUMENTS 4,578,255  3/1986  Roe et al. ............................ 423/130

FOREIGN PATENT DOCUMENTS

| 664987 | 1/1965 | Belgium ............................. 423/112 |
| 1467285 | 1/1969 | Fed. Rep. of Germany ....... 423/112 |
| 995209 | 6/1965 | United Kingdom ................ 423/112 |
| 1100232 | 6/1984 | U.S.S.R. ............................. 423/112 |

OTHER PUBLICATIONS

Miyata Kazuo, Laid Open (Kokai) #50-96460, "Method for the Separation of Red Mud Sludges", Jul. 31, 1975.

*Primary Examiner*—Robert L. Stoll
*Attorney, Agent, or Firm*—Frank M. Van Riet

[57] ABSTRACT

The iron content of Bayer process streams is reduced by contacting said stream with a tertiary hydroxyl-containing polyamine.

7 Claims, No Drawings

PROCESS FOR PURIFYING ALUMINA

The present invention is directed to a process of alumina manufacture via the Bayer process. More particularly, it is concerned with improvements in the Bayer alumina process by the removal of iron therefrom by contacting process streams with a tertiary polyamine.

BACKGROUND OF THE INVENTION

The almost universally used process for the manufacture of alumina is the Bayer process. In a typical commercial Bayer process, raw bauxite is continuously fed to a breaker. There, the ore is pulverized to a finely divided state. The pulverized ore is then fed to a slurry mixer where a 50% solids slurry is prepared using spent liquor. This bauxite slurry is then diluted and sent through three digester (in series) where, at about 300°-800° F. and 100-2000 p.s.i., 98% of the total available alumina is extracted from ore which may contain both trihydrate and monohydrate forms. The effluent from the digesters passes through a series of flash tanks wherein heat and condensate are recovered as the digested slurry is cooled to about 230° F. and brought to atmospheric pressure. The aluminate liquor leaving the flashing operation contains about 2-4 solids and is fed to the center well of a mud settler. As the mud settles, clarified sodium aluminate solution, referred to as "green" or "pregnant" liquor, overflows a weir at the top of the mud settling tank and is passed to the subsequent process steps. The settled solids ("red mud") are withdrawn from the bottom of the mud settler and passed through a countercurrent washing circuit for recovery of sodium aluminate and caustic. The red muds, include iron oxides as one of the most difficultly removed impurities. The muds appear as very fine particles which are often difficult to separate out. They usually constitute about 30-70, by weight, of the ore and must be rapidly and cleanly separated from the solubilized alumina liquid in order to make this particular step economically efficient. If the rate of separation is too slow, output is materially diminished and overall process efficiency impaired. Likewise, if the separation is not clean, the resultant alumina is somewhat crude and contains sufficiently high levels of iron to make it undesirable for a number of end-uses.

Among the methods of overcoming the above problems and materially speeding up separation of red muds from alumina as well as effecting a cleaner separation of the constitutents are those disclosed in U.S. Pat. No. 3,390,959 which employs polyacrylates as anionic flocculants and U.S. Pat. No. 3,681,012, which uses combinations of polyacrylates and starch to settle red mud in Bayer alumina recovery circuits. Also of interest in this connection are U.S. Pat. No. 3,975,496 which uses a copolymer of acrylic acid and methylolated acrylates for the same purpose, and U.K. Patent Specification Nos. 2080272 and 2112366, which use, sequentially, combinations of polyacrylic acid and acrylate-acrylamide copolymers. Other approaches have been proposed: in Japanese Patent Publication No. 56092116 (July 25, 1981) is disclosed starch cationized with a quaternary ammonium salt for use as a coagulant for red mud; U.S. Pat. No. 4,083,925 promotes ferrous iron separation from alkali metal aluminate liquor by contacting it with anionic polyacrylamide under special conditions within the mud settler; East German (DE) Pat. No. 2552804 (Aug. 11, 1987) subjects starch to treatment with sodium tetraborate and a magnesium salt to provide improved flocculating properties with lower levels of starch; Russian Pat. No. 507526 (Apr. 6, 1976) reports that cationic flocculants of the formula $(R-Ar-CH_2-N-Ph)^+Cl^-$ are better for mud solids flocculation than other known flocculants; Japanese Pat. No. J74018558 (Oct. 5, 1974) discloses using an inorganic calcium compound and sodium polyacrylate for red mud sedimentation and filtration; Japanese Pat. No. J50096460A (July 31, 1975) uses a polymeric sodium acrylate, followed by a cationic polymer flocculant, such as a poly(beta-(methacryloxy)ethyltrimethylammonium chloride) to separate red mud from waste water and U.S. Pat. No. 4,578,255 teaches the use of organic polymeric, water-soluble, cationic quaternary ammonium salts such as poly(diallyldimethyl ammonium chloride) to remove organics. Additionally, copending applications Ser. Nos. 763,863 filed Aug. 9, 1985 and 883,462, filed July 16, 1986, teach the removal of that portion of the iron impurities associated with the organics from Bayer process streams with quaternary polyamines.

While the above enumerated Bayer process stream purification methods each tend to remove some quantity of iron therefrom, none have focused exclusively on iron removal to the extent that the final alumina product is not undersirably contaminated therewith. The iron present in the Bayer process streams exists in at least one of three forms and often as all three. These three forms are particulate iron, soluble iron and colloidal iron. Oftimes one of these iron forms is removed by the normal flocculation of the red mud of the Bayer process, however, all three forms can constitute a problem when present in the liquor entering the precipitation step in that the alumina product recovered as the main product of the Bayer process will thereby be contaminated by unacceptable levels of iron.

The process of the present invention is designed to remove iron from Bayer process liquor streams no matter in which form the iron exists and usually even if present in all forms.

Thus, the instant process provides for the removal of iron from Bayer process liquors normally left behind by conventional pregnant liquor purification methods.

SUMMARY OF THE INVENTION

In accordance with the invention, an improvement has been discovered in the Bayer process of preparing alumina from bauxite. The Bayer process broadly includes the steps of digesting bauxite in aqueous solution and at elevated temperatures, usually under steam pressure with a strongly basic substance to solubilize the alumina contained in the ore. The aluminate liquor is then separated from the insoluble components of the bauxite ore which consist of the insoluble residues that remain after reaction between the bauxite ore and basic material used to digest the ore and the insoluble products which precipitate during digestion. To accomplish the above separation, the aluminate liquor is normally treated with an anionic flocculant, such as an anionic starch and/or a polyacrylate and clarified by filtration. Alumina, in relatively pure form, is then precipitated from the filtrate as a trihydrate solid. The remaining liquid phase or spent liquor is returned to the initial digestion step and employed as a digestant of additional ore after being reconstituted with additional base. Generally, liquor entrapped with the red muds is washed therefrom with aqueous caustic solution and the resultant liquor is also reused.

The above-discussed insoluble components, generically referred to as red muds, should be separated from the aluminate liquor at a relatively fast rate to make the overall Bayer process efficient. This is generally accomplished in large settlers or decanters. The separation itself should be clean and complete with but minimal amounts of red mud residue remaining as a dispersed phase in the solubilized alumina liquor. After passage through the filtration step the level of total iron in the forms of particulate, colloidal and soluble iron should be sufficiently low to provide an alumina product from the precipitation step which meets all of the industry standards.

In the above-discussed process, the improvement forming the basis of the present invention lies in adding and efficiently mixing a tertiary polyamine into the Bayer process caustic aluminate solution along with, subsequent to or followed by the conventional step of adding starch and/or a polyacrylate flocculant (e.g., in a primary settler). This treatment leads to reduced levels of iron in the filtered liquor going to precipitation when compared with state-of-the-art processes, as exemplied by the patents mentioned above. It is preferred that the tertiary polyamines be employed between the settling step and the final clarification, i.e., after the anionic flocculation has removed a majority of the solids present, however, any sequence of addition or even conjoin use is envisioned herein.

DETAILED DESCRIPTION OF THE INVENTION

According to the present invention, there is provided a process for the reduction of the iron level in aluminate liquors of the Bayer alumina recovery circuit whereby an anionic flocculant is added to the aluminate liquor in order to separate red mud and the resultant liquor is contacted with a tertiary polyamine in an amount effective to increase the efficiency of iron removal, especially in its soluble and/or colloidal form.

The amount of reduction in iron content is measured and compared with controls, which generally comprise state-of-the-art aluminate process samples. In many cases, reductions of only 5% are significant, but they can range from 10 to 50%, in comparison with the controls.

The anionic flocculant generally used in the Bayer process is selected from starch, homopolymers of acrylic acid or acrylates, copolymers of acrylic acid or acrylates containing at least 80 molar percent acrylic acid or acrylate monomers, alkali metal, alkaline earth metal or ammonium salts of said acids, or a combination of any of the foregoing. The amount of anionic flocculant normally added ranges from 0.01 to 40 lbs. of flocculant per ton of dry mud residue.

In the context of commercial plant operations, addition of the tertiary polyamine may be carried out in the caustic aluminate solution as early as the blow-off discharge from the digestion step, and may also be added to the settler feed. Preferably, however, the polyamine is added between the settler overflow and the filtration.

The tertiary polyamine to be employed in the invention can vary rather broadly in type. It should be stable under the process conditions used, e.g., high temperatures and strong caustic conditions, typically, 225° F., and 80-400 g./l. total alkali content (expressed as sodium carbonate equivalent).

The tertiary polyamines are well known to those skilled in the art and are specifically disclosed, as are methods for their production, in U.S. Pat. Nos. 1,977,253 and 3,248,353, hereby incorporated herein by reference. Generally, these tertiary polyamines are produced by reacting one mole of a monoalkyl or monoalkanol amine, with from about 0.5 to about 1.5 moles, preferably from about 0.7 to about 1.2 moles, of an epihalohydrin at a temperature ranging from about 0°-100° C. Small amounts i.e., up to about 10 mole percent of a multifunctional amine may also be co-reacted.

Suitable monoalkyl and monoalkanol amines include methylamine, ethylamine, propylamine, butylamine, ethanolamine, propanolamine, hexanolamine and the like. Suitable multifunctional amines include ammonia, ethylenediamine, diethylenetriamine, phenylenediamine and the like.

The tertiary polyamines used herein must have a molecular weight of at least 10,000, preferably, at least 100,000, and even more preferably, from about 150,000 to about 500,000. Tertiary polyamines having molecular weights below about 10,000 do not function satisfactorily in the process of the present invention. The tertiary polyamines should also preferably possess less than about 30% of quaternary nitrogen. Even more preferably, the level of quaternary nitrogen should be as low as possible.

The tertiary polyamines used in the present invention are employed by simply adding them, usually in the form of a dilute aqueous solution to the digested bauxite ore process stream containing solubilized alumina and iron dispersed throughout in an amount at least sufficient to reduce the level of iron. Generally, for best results, at least about 0.1 mg. of the tertiary polyamine, per liter of the process steam should be employed. More preferably, at least 10 mg of the tertiary polyamine are added.

It is understood, that higher amounts than those just stated may be employed without departing from the scope of the invention, although generally a point is reached in which additional amounts of tertiary polyamine do not improve the separation rate over already achieved maximum rates. Thus, it is uneconomical to use excessive amounts when this point is reached.

DESCRIPTION OF THE PREFERRED EMBODIMENTS

The following examples are set forth for purposes of illustration only and are not to be construed as limitations on the present invention except as set forth in the appended claims. All parts and percentages are by weight unless otherwise specified.

EXAMPLE 1

160.5 Parts of 40% methylamine plus 207.5 parts of water are heated to 30° C. 157.5 Parts of epichlorohydrin are added over 2.5 hours at 40°-50° C. The pH is 8.3. 76.5 Parts of 50% NaOH are added to raise the pH to 9.6. The resultant mixture is heated to 90±2° C. for a total of 6.5 hours, during which time 1.2 parts portions of epichlorohydrin are added six times at approximately 1 hour intervals and finally 0.5 part epichlorohydrin. The solution is cooled to approximately 60° C. and 158 parts of water and 58 parts of 40% $H_2SO_4$ are added.

Final concentration is approximately 30% solids, bulk viscosity is 855 cps, intrinsic viscosity is 0.568 and molecular weight is 244,000. The product is designated as Product A.

Several volumes of liquor are collected from the settler overflow of a Bayer alumina plant. Various dosages of Product A are stirred into equal portions of the liquor at 95° C. for two minutes. Following this treatment, the liquors are filtered through a cloth precoated with tricalcium aluminate slurry, to approximate the plant Kelly filters. Filtrates are then analyzed for total iron (by atomic absorption).

| Grams "as prepared" Product A[1] per liter of liquor | $Fe_2O_3$ g/l | % reduction |
|---|---|---|
| 0.0000 | 0.0092 | — |
| 0.0167 | 0.0074 | 20 |
| 0.0330 | 0.0068 | 26 |
| 0.0670 | 0.0080 | 13 |
| 0.1670 | 0.0060 | 35 |

[1]diluted to 1/30 of its original concentration before addition to the liquor.

As can be readily appreciated, substantial reductions in iron levels result from the use of Product A, even at very low levels of addition.

EXAMPLE 2

157.3 Parts of 40% methylamine 1.24 parts of ethylenediamine and 209.5 parts of water are mixed. A total of 157.5 parts of epichlorohydrin are added over a period of 2.5 hours (temperature increases from 28° to 46° C.). The solution is cooled to 40° C. and 76.5 parts of 50% NaOH are added in 30 minutes. The pH is then 10.2. The solution is heated to 92° C. (pH=8.8) for total of 3 hours, during which time 1.2 parts portions of epichlorohydrin are added periodically (5 times). When the mixture starts to gel, 100 parts of water and 66 parts of 44% $H_2SO_4$ are added. The final concentration is approximately 30% solids. The resultant product is designated Product B.

Several volumes of liquor are collected from the settler overflow in a Bayer alumina plant. Various dosages of Product B are stirred into equal portions of the liquor at 95° C. for two minutes. Following this treatment, the liquors are filtered through a cloth precoated with tricalcium aluminate slurry, to approximate the Kelly Filters in the plant. The filtrates are then analyzed for total iron (by atomic absorption).

| Grams "as prepared" Product B[1] per liter of liquor | $Fe_2O_3$ g/l | % reduction |
|---|---|---|
| 0.000 | 0.0125 | — |
| 0.033 | 0.0116 | 7 |
| 0.067 | 0.0107 | 14 |
| 0.000 | 0.0092 | — |
| 0.067 | 0.0074 | 20 |
| 0.167 | 0.0071 | 23 |

[1]diluted to 1/30 of its original concentration before addition to the liquor.

EXAMPLE 3

1. 61.1 Parts of methylamine (1.0 moles)
2. 6.6 Parts of ethylenediamine (0.11 moles)
3. 153.6 Parts of water
4. 0.3 Part of a commercially available surface-active agent
5. 0.1 Part of 50% HBr Reagents 1-5, above, are mixed in a suitable reaction vessel and heated to 30° C. Epichlorohydrin is added at a constant rate of 0.65 part per minute, using a syringe pump. 50% NaOH is added as necessary to keep the pH just above 7.0. The temperature rises to 62° C. in the first 1.5 hrs. Heat is then supplied to raise the temperature to 90° C. At the end of 2.5 hrs., all of the starting epichlorohydrin (96.0 parts) has been added as well as 35.5 parts of 50% NaOH. During the next 2 hours, the temperature is kept at 90° C. and 2.4 part portions of epichlohydrin are added approximately every 20 minutes (6 portions). During the following 2 hours, 1.2 part portions of epichlorohydrin are added twice, then 0.6 part portions are added twice. Heating at 90° C. is continued another 1.5 hours (pH 7.3) and the mixture is cooled. Dilute (0.5N) HCl is added to give a final solids concentration of 30%. The final bulk viscosity is 420 cps the intrinsic viscosity is 0.419 and the molecular weight is 148.00. The resultant product is designated Product C and is used to treat Bayer process liquor as in Example 1.

| Grams "as prepared" Product C[1] per liter of liquor | $Fe_2O_3$ g/l | % reduc |
|---|---|---|
| 0.000 | 0.0107 | — |
| 0.033 | 0.0110 | 0 |
| 0.000 | 0.0125 | — |
| 0.067 | 0.0116 | 7 |
| 0.000 | 0.0092 | — |
| 0.167 | 0.0068 | 26 |

[1]diluted to 1/30 of its original concentration before addition to the liquor.

EXAMPLE 4

160.5 Parts of 40% methylamine plus parts of water are heated to 30° C. 157.5 Parts of epichlorohydrin are added over 2.5 hours. The temperature is then 45° C. 76.5 Parts of 50% NaOH are added during the next 1.5 hours. The temperature is 49° C. The resultant mixture is heated to 91° C. during the next 30 minutes. 1.2 Part portions of epichlorohydrin are added 5 times during the next 3.5 hours, 0.6 part portions of epichlorohydrin are added three times during the next 1 hour, 0.12 part portions of epichlorohydrin are added six times during the next 3 hours, 0.06 part of epichlorohydrin are added and the resultant mixture is heated another 0.5 hour. 100 Parts of water are added and the mixture is again heated to 90° C. 0.06 part portions of epichlorhydrin are then added three times during the next hour after which 2.0 parts of methylamine (40%) and 80 parts of water are added. The media is cooled and 66.5 parts of 40% $H_2SO_4$ are added. The final concentrations is 30% solids; bulk viscosity is 866 cps and intrinisic viscosity is 0.595 corresponding to a molecular weight of about 263,000. The recovered product is designated Product D and is used to treat a Bayer liquor stream, as in Example 2.

| Grams "as prepared" Product D[1] per liter of liquor | $Fe_2O_3$ g/l | % reduction |
|---|---|---|
| 0.0000 | 0.0107 | — |
| 0.0167 | 0.0110 | 0 |
| 0.0330 | 0.0104 | 3 |
| 0.000 | 0.0125 | — |
| 0.067 | 0.0110 | 12 |
| 0.167 | 0.0092 | 26 |

[1]diluted to 1/30 of its original concentration before addition to the liquor.

EXAMPLE 5

Following the procedure of Example 4, to a filter feed liquor, at approximately 90° C. are added various dosages of Product D. The resultant media is stirred for 15 minutes and then filtered through 0.45µ millipore filter. The filtrates are analyzed for iron.

| Grams "as prepared" Product D[1] per liter of liquor | $Fe_2O_3$ g/l | % reduction |
|---|---|---|
| 0.000 | 0.0116 | — |
| 0.100 | 0.0082 | 29 |
| 0.133 | 0.0068 | 41 |
| 0.133 | 0.0073 | 37 |
| 0.167 | 0.0071 | 39 |
| 0.200 | 0.0059 | 49 |

[1]diluted to 1/30 of its original concentration before addition to the liquor.

EXAMPLES 6–12

To an aliquot the blow-off liquor of a commercial Bayer process alumina plant are added 0.4 parts per liter of Product E produced as in Example 1 except that the methyl amine is replaced by monoethanol amine. Similar aliquots are treated with equivalent amounts of closely related polyamines known in the art. The results are set forth in Table I, below:

TABLE I

| Example | Polyamine | Filtration Time(min) | Parts $Fe_2O_3$ recovered/liter |
|---|---|---|---|
| Control | — | 8.0 | 0.005 |
| 6 | Product E | 6.0 | 0.004 |
| 7C | Product X | 9.5 | 0.006 |
| Control | — | 8.0 | 0.008 |
| 8C | Product Y | 8.3 | 0.008 |
| 9C | Product Z | 9.2 | 0.008 |
| 10C | Product X | 8.7 | 0.007 |
| Control | — | — | 0.009 |
| 11C | Product X | 10.5 | 0.007 |

TABLE I-continued

| Example | Polyamine | Filtration Time(min) | Parts $Fe_2O_3$ recovered/liter |
|---|---|---|---|
| 12C* | Product X | 10.5 | 0.006 |

C = Comparative
Product X = polyamine produced from diethanolamine and epichlorohydrin.
Product Y = commercially available polyamine produced from dimethylamine and epichlorohydrin (M.W. 50,000).
Product Z = same as Product Y but M.W. 75,000.
*simulated overflow liquor made by settling blow-off liquor.

EXAMPLES 13–17

To the settler overflow liquor of a commercial alumina plant are added various dosages of Product E and an other commercially available closely related polyamine. The results are set forth in Table II, below:

TABLE II

| Example | Polyamine | Dosage Grams/liter | $Fe_2O_3$ mg/l |
|---|---|---|---|
| Control | — | — | 12.6 |
| 13 | Product E | 0.50 | 9.7 |
| 14 | " | 0.15 | 7.4 |
| 15 | " | 0.05 | 11.3 |
| Control | — | — | 9.3 |
| 16C | Product X | 0.50 | 13.4 |
| 17C | " | 0.05 | 10.2 |

C = Comparative

EXAMPLES 18–25

To settler overflow liquor at 95+5° C. from a Bayer plant, a methylamine/epichlorohydrin polymer produced as in Example 1 and having a bulk viscosity of 400 cps at 30% solids is added at various dosages (after dilution to 1% solution). The polymer is stirred in for 2 minutes, then the mixture is filtered through a cloth precoated with lime slurry. Filtrates are analyzed for iron by atomic absorption spectroscopy (A.A.). The results are set forth in Table III, below:

TABLE III

| Example | Reagent Added Grams/l | $Fe_2O_3$ mg/l |
|---|---|---|
| — | Control | 5.8 |
| 18 | 0.010 | 4.9 |
| 19 | 0.040 | 3.6 |
| — | Control | 6.5 |
| 20 | 0.020 | 5.0 |
| 21 | 0.010 | 4.0 |
| 22 | 0.30 | 3.0 |
| — | Control | 7.4 |
| 23 | 0.020 | 6.1 |
| 24 | 0.040 | 6.1, 5.6 |
| — | Control | 8., 7. |
| 25 | 0.30 | 4., 3. |

EXAMPLES 26–28

Product C is added to a Bayer settler overflow liquor as in Examples 18–25. The results are set forth in Table IV, below.

TABLE IV

| Example | Product C Added Grams/l | $Fe_2O_3$ mg/l |
|---|---|---|
| — | Control | 6.1, 6.4 |
| 26 | 0.020 | 5.5 |
| — | Control | 7.4 |
| 27 | 0.020 | 7.2 |

TABLE IV-continued

| Example | Product C Added Grams/l | Fe$_2$O$_3$ mg/l |
| --- | --- | --- |
| 28 | 0.040 | 6.6 |

EXAMPLES 29-32

A 30% solution of Product C is added to Bayer alumina liquor from the digester blow-off, as shown in Table V below:

TABLE V

| Example | Grams/l of 30% Solution of Product C | Fe$_2$O$_3$ mg/l |
| --- | --- | --- |
| — | Control | 6.0 |
| 29 | 1.0 | 6.0 |
| As above, but added to settler overflow liquor. | | |
| — | None | 6.0 |
| 30 | 0.10 | 5.0 |
| 31 | 0.50 | 4.0 |
| 32 | 1.0 | 3.0, 3.0 |

EXAMPLES 33-36

An ethanolamine/epichlorhydrin polyamine (Product F) having a bulk viscosity of 27.5 cps at 30% solids is added to settler overflow liquor in a Bayer alumina plant. Reagent is stirred in for 60 seconds then the liquor is allowed to settle while being kept at 95±5° C. on a hot plate for 60 minutes. Samples are withdrawn from the top for measurements of iron level and turbidity and filtration time (for 100 ml through a Whatman #54 paper) is also noted., see Table VI, below.

TABLE VI

| Example | Reagent | Dosage Grams/l | Fe$_2$O$_3$ ppm | % Reduction Vs. Control | Turbidity (ABS. @ 900 nm) | Filtration Time for 100 mls (Sec.) |
| --- | --- | --- | --- | --- | --- | --- |
| — | (None) | — | 10 | — | 0.070 | 118 |
| — | (None) | — | 13.5 | — | 0.088 | 112 |
| — | (None) | — | 10.5 | — | 0.076 | 108 |
| 33 | Product F | 0.005 | 8 | 24 | 0.035 | 109 |
| 34 | " | 0.010 | 6 | 43 | 0.034 | 112 |
| 35 | " | 0.010 | 7 | 48 | 0.031 | 103 |
| 36 | " | 0.050 | 4 | 60 | 0.019 | 82 |

EXAMPLES 37-60

Following the procedure of Example 18, varying dosages of a series of tertiary polyamines falling within the scope of the present invention are added to various aliquots of a settler overflow liquor from a Bayer process plant as follows. The filter cloth discs are rinsed and precoated with 60 ml. of lime slurry under vacuum. 500 Ml of the liquor are charged to a suitable vessel with heating and agitation. The indicated dose of polyamine solution is added, stirred, and filtered through the precoated filter. The filtrates are then analyzed for iron by an Inductively Coupled Plasma Method. The results are set forth in Table VII, below:

TABLE VII

| Example | Reagent | Dosage grams per liter of liquor | Fe$_2$O$_3$ g/l |
| --- | --- | --- | --- |
| — | — | — | 0.0085 |
| 37 | G | 0.02 | 0.0077 |
| 38 | G | 0.05 | 0.0063 |
| 39 | G | 0.10 | 0.0050 |
| 40 | H | 0.02 | 0.0079 |
| 41 | H | 0.05 | 0.0074 |
| 42 | H | 0.10 | 0.0039 |
| — | I | — | 0.0096 |
| 43 | I | 0.02 | 0.0077 |
| 44 | I | 0.05 | 0.0068 |
| 45 | I | 0.10 | 0.0046 |
| 46 | J | 0.02 | 0.0074 |
| 47 | J | 0.05 | 0.0070 |
| 48 | J | 0.10 | 0.0035 |
| — | — | — | 0.0071 |
| 49 | K | 0.02 | 0.0061 |
| 50 | K | 0.05 | 0.0052 |
| 51 | K | 0.10 | 0.0033 |
| 52 | L | 0.02 | 0.0059 |
| 53 | L | 0.05 | 0.0048 |
| 54 | L | 0.10 | 0.0033 |
| Example | Reagent | Dosage parts per liter of liquor | Fe$_2$O$_3$ g/l |
| — | — | — | 0.0058 |
| 55 | M | 0.02 | 0.0054 |
| 56 | M | 0.05 | 0.0046 |
| 57 | M | 0.10 | 0.0033 |
| — | — | — | 0.0085 |
| 58C | N* | 0.02 | 0.0079 |
| 59C | N* | 0.05 | 0.0079 |
| 60C | N* | 0.10 | 0.0081 |

C = Comparative
*commercially available dimethylamine/epichlorohydrin reaction product of ca 250,000 M.W.
G = Same reagent as Example 4.
H = Same reagent as Example 1.
I = Similar reagent as Example 4 except bulk viscosity of 1455 cps.; intrinsic viscosity of 0.707 (molecular weight ca 349,000.)
J = Similar reagent as Example 1 except bulk viscosity of 465 cps.; intrinsic viscosity of 0.541 (molecular weight ca 225,000.)
K = Similar reagent as Example 4 except bulk viscosity of 1275 cps; intrinsic viscosity of 0.635 (molecular weight ca 293,000.)
L = Similar reagent as Example 2 except bulk viscosity of 760 cps.; intrinsic viscosity of 0.655 (molecular weight ca 316,000.)
M = Similar reagent as Example 2 except bulk viscosity of 980 cps.; intrinsic viscosity of 0.629 (molecular weight ca 288,000.)

It is understood that mixtures of polyamines of the present invention as well as other materials may be added together and remain within the scope hereof. These auxiliary chemicals may be added as dispersing aids, extenders, anti-foamers, etc. It is preferred that such additives be added in form of aqueous solutions in order to insure ready dissolution of the additive into the digester ore slurries.

EXAMPLE 61

Digester blow-off liquor is collected from a Bayer alumina plant. To a first portion of this liquor is added 0.15 gram of Product D of Example 4 (as is) per liter of liquor. After 2 minutes, a commercially available polyacrylate red mud flocculant is added (2 mg/l). A second portion of the liquor is treated only with the flocculant (control).

After settling for 10 minutes in each instance, the supernatant liquor is filtered and 500 ml of the filtered liquor is put into a 1 liter vessel, and 25.00 gram of aluminum trihydrate seed is added.

The vessels are mixed by rolling while in a 75° C. oven for 24 hours. At the end of this time, the slurry is filtered and the precipitate is washed with 1.5 l of boiling water. The precipitate is dried at 105° C., weighed, then analyzed for iron content (following results are corrected the starting seed).

|  | % $Fe_2O_3$ in precipitated alumina |
|---|---|
| Control | 0.025 |
| 0.15 g/l Product D | 0.021 |

We claim:

1. In a process for separating insoluble red mud from Bayer process streams the improvement which comprises contacting and mixing a Bayer process stream with a tertiary polyamine having a molecular weight of at least about 10,000 in an amount effective to reduce the iron content thereof.

2. A process as defined in claim 1 wherein the amount of tertiary polyamine employed comprises at least about 1.0 mg per liter of process stream.

3. A process as defined in claim 1 wherein the tertiary polyamine employed is produced from (1) a monoalkylamine or monoalkanol amine and (2) epihalohydrin and (3) up to about 10 mole percent of, an alkylene diamine or ammonia.

4. A process as defined in claim 3 wherein the monoalkylamine employed is monomethylamine.

5. A process as defined in claim 3 wherein the monoalkylamine employed is monoethanolamine.

6. A process as defined in claim 1 wherein the polyamine is added between the digestion step and the filtration step of the Bayer process.

7. A process as defined in claim 1 wherein the polyamine is added to the settler overflow.

* * * * *